(12) United States Patent
Bai et al.

(10) Patent No.: US 10,757,363 B2
(45) Date of Patent: Aug. 25, 2020

(54) METHOD AND SYSTEM FOR RECONSTRUCTING A VEHICLE SCENE AT A CLOUD LAYER

(71) Applicant: GM GLOBAL TECHNOLOGY OPERATIONS LLC, Detroit, MI (US)

(72) Inventors: Fan Bai, Ann Arbor, MI (US); Mohannad Murad, Troy, MI (US); Douglas C. Martin, Goodrich, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 122 days.

(21) Appl. No.: 16/175,343

(22) Filed: Oct. 30, 2018

(65) Prior Publication Data

US 2020/0137351 A1    Apr. 30, 2020

(51) Int. Cl.
| | |
|---|---|
| *G06K 9/00* | (2006.01) |
| *H04N 7/12* | (2006.01) |
| *H04L 29/08* | (2006.01) |
| *H04N 7/025* | (2006.01) |
| *G05D 1/02* | (2020.01) |
| *G06T 3/40* | (2006.01) |
| *G06F 16/71* | (2019.01) |
| *G06F 16/78* | (2019.01) |

(52) U.S. Cl.
CPC ............. *H04N 7/12* (2013.01); *G05D 1/0246* (2013.01); *G05D 1/0276* (2013.01); *G06F 16/71* (2019.01); *G06F 16/7867* (2019.01); *G06K 9/00744* (2013.01); *G06T 3/40* (2013.01); *H04L 67/10* (2013.01); *H04L 67/2842* (2013.01); *H04N 7/025* (2013.01); *G05D 2201/0213* (2013.01); *G06K 9/00791* (2013.01)

(58) Field of Classification Search
CPC .......... H04N 7/12; H04N 7/025; G06F 16/71; G06F 16/7867; G05D 1/0246; G05D 1/0276; G05D 2201/0213; G06K 9/00744; G06K 9/00791; G06K 3/40
See application file for complete search history.

(56) References Cited

U.S. PATENT DOCUMENTS

| | | | |
|---|---|---|---|
| 2018/0143305 A1* | 5/2018 | Buskila | ................. G01S 7/4815 |
| 2020/0026278 A1* | 1/2020 | Khanna | .................... B60R 1/00 |
| 2020/0027333 A1* | 1/2020 | Xu | ........................ G08B 25/007 |

* cited by examiner

*Primary Examiner* — Ping Y Hsieh
(74) *Attorney, Agent, or Firm* — Reising Ethington, P.C.

(57) ABSTRACT

A method and system for gathering vehicle video data, processing the vehicle video data, and providing the processed data to a cloud layer that reconstructs the scene encountered by the vehicle. By reconstructing the encountered scene at the cloud layer, a variety of commands can be generated for that vehicle or other vehicles in the vicinity, where the commands address the conditions being experienced by the vehicles. This may be particularly useful for autonomous or semi-autonomous vehicles. If the reconstructed scene is not sufficiently accurate or detailed, one or more data extraction parameter(s) can be adjusted so that additional data is provided to the cloud layer; if the reconstructed scene is sufficiently accurate, then the data extraction parameter(s) can be adjusted so that less data is provided to the cloud layer, thus, reducing unnecessary cellular data charges.

18 Claims, 5 Drawing Sheets

METHOD AND SYSTEM FOR RECONSTRUCTING A VEHICLE SCENE AT A CLOUD LAYER

TECHNICAL FIELD

Exemplary embodiments relate to gathering data at a vehicle and processing the data at a cloud-based facility and, more particularly, to a system and method that enable gathering and processing of such data, for example vehicle video data, in a more efficient manner.

INTRODUCTION

Modern vehicles are gathering, processing and storing an ever-increasing amount of data. This is particularly true in the context of autonomous or semi-autonomous vehicles, as the cloud-based systems used to control and coordinate such vehicles require an inordinate amount of data to carry out their numerous tasks, many of which must be performed quickly and with little latency.

One challenge with such systems relates to managing the exchange of such large amounts of data, and doing so in an expeditious and cost effective manner. For instance, if a fleet of autonomous or semi-autonomous vehicles are using established wireless carrier systems to exchange such data, then cellular data charges based on the amount of data will likely apply. These cellular data charges can become quite substantial, particularly when the amount of data exchanged per vehicle is large and is multiplied across an entire fleet of such vehicles.

The method and system disclosed herein are designed to address these issues.

SUMMARY

According to one aspect, there is provided a method of reconstructing a vehicle scene with a cloud-based system, the cloud-based system includes a vehicle layer, a fog layer and a cloud layer, the method comprising the steps: gathering vehicle video data with one or more vehicle camera(s); processing the vehicle video data using one or more data extraction technique(s), the data extraction technique(s) are carried out according to one or more data extraction parameter(s); sending the processed video data to the fog layer and/or the cloud layer; sending index data to the fog layer and/or the cloud layer; reconstructing the vehicle scene at the cloud layer using the processed video data and the index data; evaluating the reconstructed vehicle scene at the cloud layer to determine if more or less data is needed from the vehicle layer; and making adjustments to the data extraction parameter(s) used by the vehicle layer, wherein the adjustments are based on the determination that more or less data is needed from the vehicle layer.

According to various embodiments, this method may further include any one of the following features or any technically-feasible combination of some or all of these features:

at least one data extraction technique(s) selected from a list consisting of: a time-domain down sampling technique, a pixel-domain down sampling technique, or a feature-domain down sampling technique;

the data extraction technique is a time-domain down sampling technique and the data extraction parameter is a time-based sampling rate, and wherein the method reduces the vehicle video data being transferred to the cloud layer over a wireless carrier system by using the time-based sampling rate to reduce the number of individual video frames;

the data extraction technique is a pixel-domain down sampling technique and the data extraction parameter includes at least one parameter selected from a list consisting of: image resolution, image color depth, image field-of-view (FOV), image compression, or image type, and wherein the method reduces the vehicle video data being transferred to the cloud layer over a wireless carrier system by using the at least one parameter to reduce the amount of information per individual video frame;

the data extraction technique is a feature-domain down sampling technique and the data extraction parameter includes at least one parameter selected from a list consisting of: a number of objects or features, a number of object or feature data points, a sampling rate for objects or features, or a technique used to convert or project original data into an orthogonal time series, and wherein the method reduces the vehicle video data being transferred to the cloud layer over a wireless carrier system by using the at least one parameter to only track certain objects or features within individual video frames;

the sending the processed video data step further comprises sending the processed video data from the vehicle layer to the fog layer via a wireless carrier system, and sending the processed video data from the fog layer to the cloud layer;

the sending the processed video data step further comprises caching at least some of the processed video data at the fog layer;

the sending the index data step further comprises sending the index data from the vehicle layer to the fog layer and/or the cloud layer via a wireless carrier system;

isolating the processed video data from the index data so that a data plane is maintained separate from a control plane;

the sending the index data step further comprises sending at least one piece of index data selected from a list consisting of: context data, content or tag data, search data, retrieval data, index commands or control commands;

the reconstructing step further comprises searching and retrieving processed video data from the fog layer and index data from the cloud layer that was previously saved in order to reconstruct the vehicle scene at the cloud layer, wherein the previously saved data are retrieved based on a location of the vehicle scene being reconstructed;

the saved data was provided by a plurality of vehicles who previously drove by the location of the vehicle scene being reconstructed;

the evaluating step further comprises evaluating the reconstructed vehicle scene by generating a confidence level score representative of the confidence of the system in the accuracy or completeness of the reconstructed vehicle scene;

the evaluating step further comprises comparing the confidence level score to a confidence threshold, when the confidence level score is greater than the confidence threshold then adjusting the data extraction parameters so that less processed video data and/or index data is provided by the vehicle layer, and when the confidence level score is not greater than the confidence threshold then adjusting the data extraction parameters so that more processed video data and/or index data is provided by the vehicle layer;

the making adjustments step further comprises adjusting at least one data extraction parameter selected from a list consisting of: a time-based sampling rate, an image resolution, an image color depth, or an image field-of-view (FOV) so that more or less data is needed from the vehicle layer;

the gathering step further comprises gathering vehicle video data with one or more vehicle camera(s) located on a first vehicle of the vehicle layer, whereas the making adjustments step further comprises making adjustments to data extraction parameter(s) used by a second vehicle of the vehicle layer, wherein the second vehicle encounters the vehicle scene after the first vehicle; and generating one or more commands for an autonomous or semi-autonomous vehicle based on the outcome of the vehicle scene reconstruction.

According to another aspect, there is provided a cloud-based system for reconstructing a vehicle scene, comprising: a vehicle layer having a plurality of autonomous or semi-autonomous vehicles, each of the vehicles includes one or more vehicle camera(s); a fog layer having hardware and being connected to the vehicle layer via a wireless carrier system; and a cloud layer having hardware and being connected to the vehicle layer via the wireless carrier system and being connected to the fog layer; the vehicle layer hardware is configured to: gather vehicle video data with the vehicle camera(s), process the vehicle video data using one or more data extraction technique(s) that are carried out according to one or more data extraction parameter(s), send the processed video data to the fog layer and/or the cloud layer, and send index data to the fog layer and/or the cloud layer; the cloud layer hardware is configured to: reconstruct the vehicle scene using the processed video data and the index data, evaluate the reconstructed vehicle scene to determine if more data, less data or different data is needed from the vehicle layer, and make adjustments to the data extraction parameter(s) used by the vehicle layer; wherein the adjustments are based on the determination that more data, less data or different data is needed from the vehicle layer.

BRIEF DESCRIPTION OF THE DRAWINGS

One or more exemplary embodiments will hereinafter be described in conjunction with the appended drawings, wherein like designations denote like elements, and wherein.

DETAILED DESCRIPTION OF THE ILLUSTRATED EMBODIMENT(S)

The method and system disclosed herein gather data at a vehicle (e.g., vehicle video data captured by one or more cameras), process the gathered data according to one or more data extraction technique(s), and provide the processed data to a cloud layer that reconstructs the scenario or scene encountered by the vehicle. By reconstructing the encountered scenario at the cloud layer, the method and system can then generate a variety of commands for that vehicle or other vehicles in the vicinity that address the conditions being experienced by the vehicles. This may be particularly useful in the context of autonomous or semi-autonomous vehicles. If the reconstructed scenes are not sufficiently accurate or detailed, the method and system can adjust one or more data extraction parameter(s) so that additional data is provided to the cloud layer; if the reconstructed scenes are sufficiently accurate but are incurring too many cellular data charges, then the method and system may adjust the data extraction parameter(s) so that less data is provided to the cloud layer and the resulting cellular data charges are reduced. The present method and system are designed to carry out the aforementioned tasks in an expeditious, cost effective and flexible manner.

Figure 1:
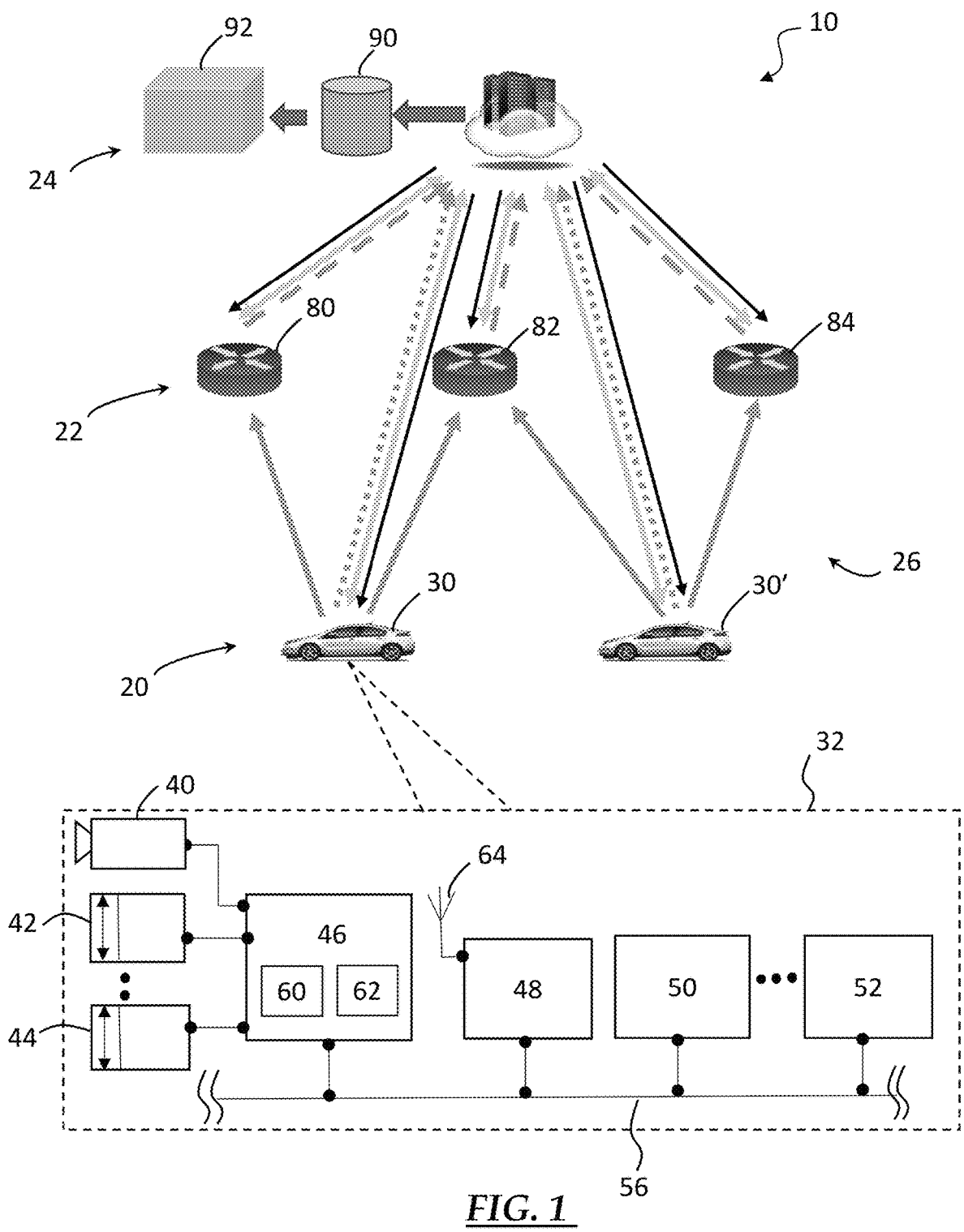
FIG. 1 is a schematic block diagram of an embodiment of a system that includes a vehicle layer, a fog layer and a cloud layer, and the vehicle layer includes a schematic block diagram of vehicle hardware that may be used.

Turning now to FIG. 1, there is shown a schematic block diagram of an example of a cloud-based system 10 for controlling a fleet of autonomous or semi-autonomous vehicles, where the system is capable of carrying out the present method. As used herein, the phrase "autonomous or semi-autonomous vehicles" broadly means any vehicle capable of automatically performing a driving-related action or function, without a driver request, and includes actions falling within levels 1-5 of the Society of Automotive Engineers (SAE) International classification system. System 10 may include a vehicle layer 20, a fog layer 22 and a cloud layer 24, and uses a wireless carrier system 26 to communicate. It should be appreciated that while system 10 is represented according to a three-tier communication network architecture (i.e., vehicle-fog-cloud layers), this is merely a schematic example of the system architecture and other architectures may be used instead.

The vehicle layer 20 includes one or more autonomous or semi-autonomous vehicles 30, 30' (e.g., the vehicle layer could include a fleet of such vehicles), each of which is equipped with the requisite hardware and software needed to gather, process and exchange data with other components of system 10. According to a non-limiting example, vehicle 30 is an autonomous or semi-autonomous vehicle and includes vehicle hardware 32 with one or more vehicle camera(s) 40, one or more vehicle sensor(s) 42, 44, a vehicle data processing module 46, a vehicle communications module 48, a vehicle autonomous driving module 50, other vehicle electronic modules 52, as well as any other suitable combination of systems, modules, devices, components, hardware, software, etc. that are needed to carry out autonomous or semi-autonomous driving functionality. The various components of the vehicle hardware 32 may be connected by a vehicle communication network 56 (e.g., a wired vehicle communications bus, a wireless vehicle communications network, or some other suitable communications network).

Skilled artisans will appreciate that the schematic block diagram of the vehicle hardware 32 is simply meant to illustrate some of the more relevant hardware components used with the present method and it is not meant to be an exact or exhaustive representation of the vehicle hardware that would typically be found on such a vehicle. Furthermore, the structure or architecture of the vehicle hardware 32 may vary substantially from that illustrated in FIG. 1 (e.g., camera 40 and/or sensors 42, 44 could be connected directly to vehicle communication network 56 and/or some combination of modules 46-52; or camera 40, sensors 42, 44 and/or modules 46-52 could be combined or integrated with one another according to some other arrangement, as opposed to all being separate stand-alone components, to name a few possibilities). Thus, because of the countless number of potential arrangements and for the sake of brevity and clarity, the vehicle hardware 32 is described in conjunction with the illustrated embodiment of FIG. 1, but it should be appreciated that the present system and method are not limited to such.

Vehicle camera(s) 40 are mounted on vehicle 30 and may include any suitable system known or used in the industry. Although the following examples describe the vehicle camera 40 in the context of a video or still camera that generates corresponding images, vehicle camera 40 may include radar-based, lidar-based, ultrasonic-based and/or other types of vision systems in addition to or in lieu of traditional cameras. Thus, vehicle camera 40 is not limited to any particular kind of vehicle vision system, so long as it is capable of gathering images, representations and/or other information regarding the environment around the vehicle. According to a non-limiting example, vehicle 30 includes a collection of CMOS cameras or image sensors 40 located around the vehicle, including a number of forward-facing CMOS cameras that provide digital images that can be subsequently stitched together to yield a 2D or 3D representation of the road and environment in front and/or to the side of the vehicle. The vehicle camera 40 may provide vehicle video data to one or more components of the vehicle hardware 32, including the vehicle data processing module 46. Depending on the particular application, the vehicle camera 40 may be: a still camera, a video camera, a radar unit, a lidar unit and/or some other type of image generating device; a BW and/or a color camera; a front-, rear-side- and/or 360°-facing camera; part of a mono and/or stereo system; an analog and/or digital camera; a short-, mid- and/or long-range camera; and a wide and/or narrow FOV (aperture angle) camera, to cite a few possibilities. In one example, the vehicle camera 40 outputs raw vehicle video data (i.e., with no or little pre-processing), whereas in other examples the vehicle camera 40 includes image processing resources and performs pre-processing on the captured images before outputting them as vehicle video data.

Vehicle sensor(s) 42, 44 are mounted on vehicle 30 and may include any suitable sensor type known or used in the industry. Although the following examples describe vehicle sensor 42 in the context of a vehicle dynamics sensor and vehicle sensor 44 in the context of an environmental sensor, it should be appreciated that these are just examples. Thus, vehicle sensors 42, 44 are not limited to any particular kind of sensor, so long as it is capable of providing vehicle sensor data that in some way explains, supplements and/or enhances the corresponding vehicle video data from vehicle camera 40. According to a non-limiting example, vehicle sensor 42 measures the location, the speed or acceleration, the stability (e.g., wheel slippage, loss of traction) and/or some other operating parameter of the vehicle 30. For instance, vehicle sensor 42 may output vehicle sensor data in the form of vehicle location information (e.g., GPS coordinates) at the same time that vehicle camera 40 is outputting vehicle video data so that images from the camera can be correlated to the particular location of the vehicle at that time. Vehicle sensor 44, on the other hand, can measure outside or environmental conditions (e.g., temperature, precipitation, nighttime/daytime conditions, etc.), road conditions (e.g., the type of road surface, a bend or curve in the road, a fork in the road, posted speed limit, etc.), traffic conditions, etc. For example, vehicle sensor 44 may sense the outside temperature and/or detect an ice patch on the road at same time that vehicle camera 40 captures vehicle video data so that the different frames of the video can be correlated or connected to the corresponding conditions that were being experienced by the vehicle at that time. By contemporaneously gathering vehicle sensor data along with the vehicle video data, system 10 is better able to accurately reconstruct the scene and conditions experienced by the vehicle, as will explained.

Vehicle data processing module 46, vehicle communications module 48, vehicle autonomous driving module 50, as well as the other vehicle electronic modules 52 may include any suitable components and be arranged according to any suitable configurations known or used in the industry. Because the particular architectures of modules 46-52 are not critical and because these modules can be provided according to so many different embodiments, the following description of components of module 46 can apply to any of the modules 46-52, except for where stated otherwise. For instance, each of the modules 46-52 may include one or more processing device(s) 60, memory device(s) 62, I/O device(s), as well as any other hardware and/or software typically found on such modules. The processing device 60 can be any type of device capable of processing electronic instructions including microprocessors, microcontrollers, host processors, controllers, vehicle communication processors, General Processing Unit (GPU), accelerators, Field Programmable Gated Arrays (FPGA), and Application Specific Integrated Circuits (ASICs), to cite a few possibilities. It can be a dedicated processor used only for module 46 or can be shared with other vehicle systems, modules, devices, components, etc. The processing device 60 can execute various types of electronic instructions, such as software and/or firmware programs stored in the memory device 62, which enable the module 46 to carry out various functionality. The memory device 62 can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. In one example, the processing device 60 executes programs or processes data and the memory device 62 stores programs or other data in order to help carry out or support at least a part of the present method.

Vehicle data processing module 46 receives vehicle video data and vehicle sensor data from vehicle camera 40 and vehicle sensors 42, 44, respectively, and is designed to process, compress and/or otherwise prepare such data before sending it to the fog and cloud layers 22, 24 of the system over the wireless carrier system 26. Vehicle data processing module 46 is indirectly or directly connected to the vehicle camera 40 and vehicle sensors 42, 44, as well as any combination of the other modules 48-52 (e.g., via vehicle communications network 56). It is possible for the vehicle data processing module 46 to be integrated or combined with the vehicle camera and/or sensors 40-44 so that they are part of a single packaged module or unit, or it is possible for the module 46 to be combined with any of the modules 48-52.

Vehicle communications module 48 provides the vehicle with short range and/or long range wireless communication capabilities so that the vehicle can communicate and exchange data with the fog and/or cloud layers 22, 24 of the system. For instance, vehicle communications module 48 may include a short range wireless circuit that enables short range wireless communications with any number of nearby devices (e.g., Bluetooth™, other IEEE 802.15 communications, Wi-Fi™, other IEEE 802.11 communications, vehicle-to-vehicle communications, etc.), as well as a cellular chipset and/or a vehicle telematics unit that enables long range wireless communications with the different layers 22, 24 (e.g., cellular, telematics communications, etc.). According to one non-limiting example, the vehicle communications module 48 includes the processing and memory devices 60, 62 mentioned above, a short range wireless circuit, a long range wireless circuit in the form of a cellular chipset, and one or more antenna(s) 64. Vehicle communications module 48 is indirectly or directly connected to the vehicle camera 40 and vehicle sensors 42, 44, as well as any combination of the other modules 46, 50, 52 (e.g., via vehicle communications network 56). It is possible for module 48 to be integrated or combined with any of the modules 46, 50, 52.

Vehicle autonomous driving module 50 provides the vehicle with autonomous and/or semi-autonomous driving capabilities and, depending on the particular embodiment, may be a single module or unit or a combination of modules or units. For instance, module 50 may include the following sub-modules (whether they be hardware, software or both): a perception sub-module, a localization sub-module and/or a navigation sub-module. The particular arrangement, configuration and/or architecture of the vehicle autonomous driving module 50 is not important, so long as the module helps enable the vehicle to carry out autonomous and/or semi-autonomous driving functions. Vehicle autonomous driving module 50 is indirectly or directly connected to the vehicle camera 40 and vehicle sensors 42, 44, as well as any combination of the other modules 46, 48, 52 (e.g., via vehicle communications network 56). It is possible for module 50 to be integrated or combined with any of the modules 46, 48, 52.

Vehicle electronic modules 52 may include any other suitable modules needed to help implement the present method. For instance, module 52 may include any combination of a powertrain control module (PCM), an engine control module (ECM), a transmission control module (TCM), a body control module (BCM), a traction control or stability control module, a cruise control module, a steering control module, a brake control module, an infotainment module, etc. As with the previous modules, vehicle control module 52 may be indirectly or directly connected to the vehicle camera 40 and vehicle sensors 42, 44, as well as any combination of the other modules 46-50 (e.g., via vehicle communications network 56). It is possible for module 52 to be integrated or combined with any of the modules 46-50.

Fog layer 22 is part of system 10 and may include any suitable combination of hardware, firmware, software, etc. needed to communicate with the vehicle and cloud layers 20, 24 and to carry out the method described herein. For instance, the fog layer 22 may include various combinations of servers, routers, switches, processing units (e.g., central processing units (CPUs)), circuits (e.g., application specific integrated circuits (ASICs)), data storage devices 80-84, etc. that are needed to carry out various edge computing and other tasks required by the present method. The fog layer is also referred to as the "mobile edge computing (MEC) layer," and these terms may be used interchangeably throughout the present application. In one embodiment, the fog layer 22 includes hardware that enables a high speed, low latency path for a data plane established between the vehicle layer 20 and the cloud layer 24, as well as hardware for caching video data and/or index data from the vehicle layer 20 so that such data can be accessed and retrieve by the cloud layer 24.

Cloud layer 24 is part of system 10 and may include any suitable combination of hardware, firmware, software, etc. needed to communicate with the vehicle and fog layers 20, 22 and to carry out the method described herein. The cloud layer 24 may include various combinations of servers, routers, switches, processing units (e.g., central processing units (CPUs)), circuits (e.g., application specific integrated circuits (ASICs)), data storage devices 90, etc. that are needed to carry out different tasks associated with vehicle scene reconstruction, as well as other autonomous vehicle tasks. In one embodiment, the cloud layer 24 includes hardware that enables a path for both a data plane and a control plane established with the vehicle layer 20 and/or the fog layer 22, as well as hardware needed for reconstructing various vehicle scenes, as will be described below. Because of the widespread knowledge in the art of both fog and cloud layer architectures, and because the present method and system are not intended to be confined to any particular architecture or arrangement and can be used with a wide range of such architectures, additional detailed descriptions of the fog and cloud layers 22, 24 have been omitted.

Wireless carrier system 26 is used by system 10 to communicate data and other information and may include any suitable combination of hardware, firmware, software, etc. needed to carry out cellular communications and/or other wireless communications between the vehicle, fog and cloud layers 20, 22, 24. Cellular network or wireless carrier system 26 is preferably a cellular telephone system that includes a number of cellular base stations BS (only one shown), one or more mobile switching centers (MSCs), as well as any other networking components required to connect network 26 with a land network. Wireless carrier system 26 can implement any suitable communications technology, including for example, analog technologies such as AMPS, or digital technologies such as CDMA, W-CDMA or OFDMA (e.g., 3G, 4G, 5G, etc.) or GSM/GPRS. As will be appreciated by those skilled in the art, various cell tower/base station/MSC arrangements are possible and could be used with wireless carrier system 26. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. One or more segments of wireless carrier system 26 could be implemented through the use of a standard wired network, a fiber or other optical network, a cable network, power lines, other wireless networks such as wireless local area networks (WLANs), or networks providing broadband wireless access (BWA), some other short range wireless communications (e.g., any of the IEEE 802.11 protocols, WiMAX, ZigBee™, Wi-Fi direct, Bluetooth, or near field communication (NFC)). Because of the widespread knowledge in the art of wireless carrier systems, and because the present method and system are not intended to be confined to any particular system and can be used with a wide range of such systems, additional detailed descriptions of the wireless carrier system 26 has been omitted.

Figure 2A:
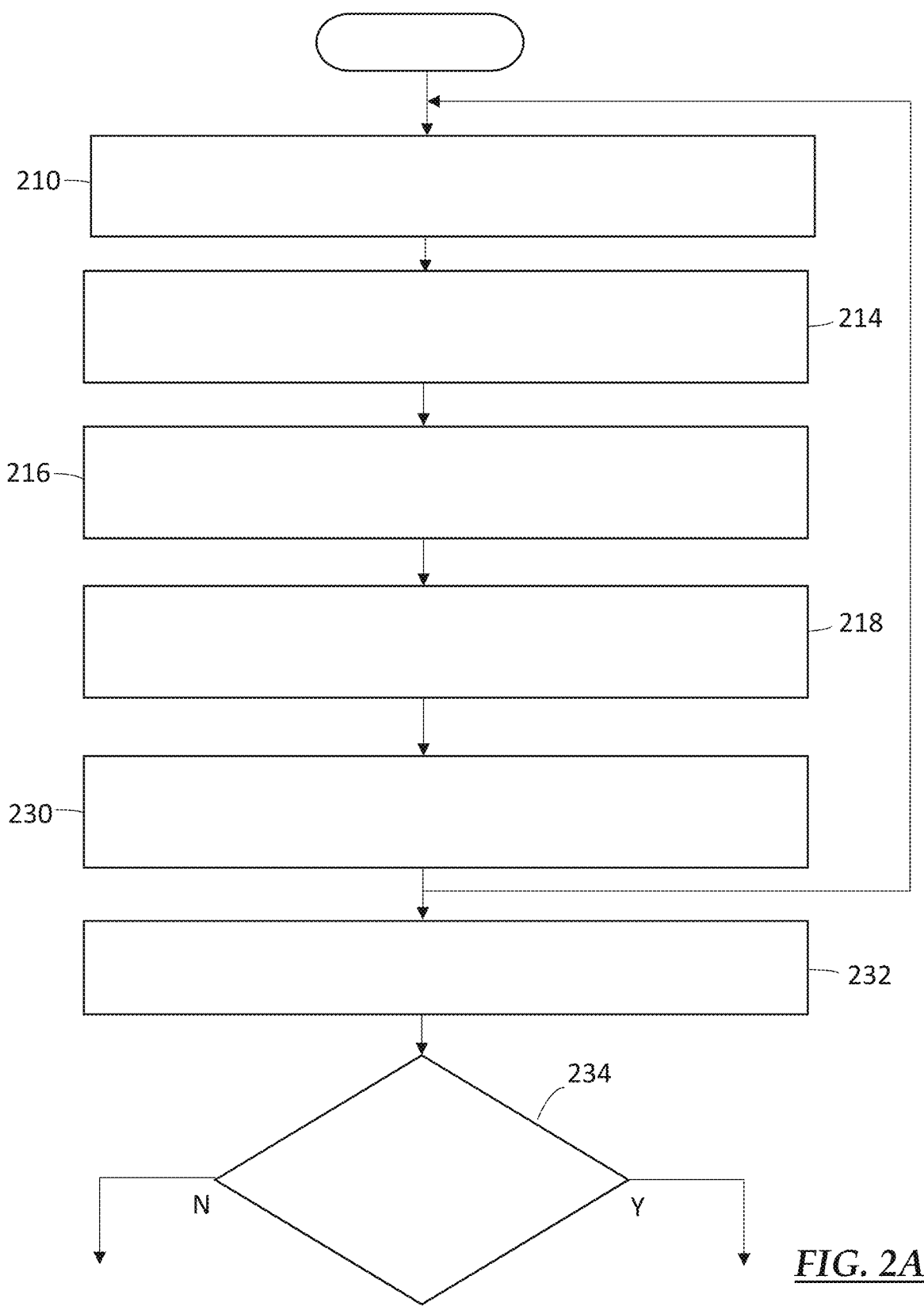
FIGS. 2A and 2B are flowcharts depicting an embodiment of a method for reconstructing a vehicle scene at a cloud layer, where the method may be used in conjunction with the system of FIG. 1.
Figure 2B:
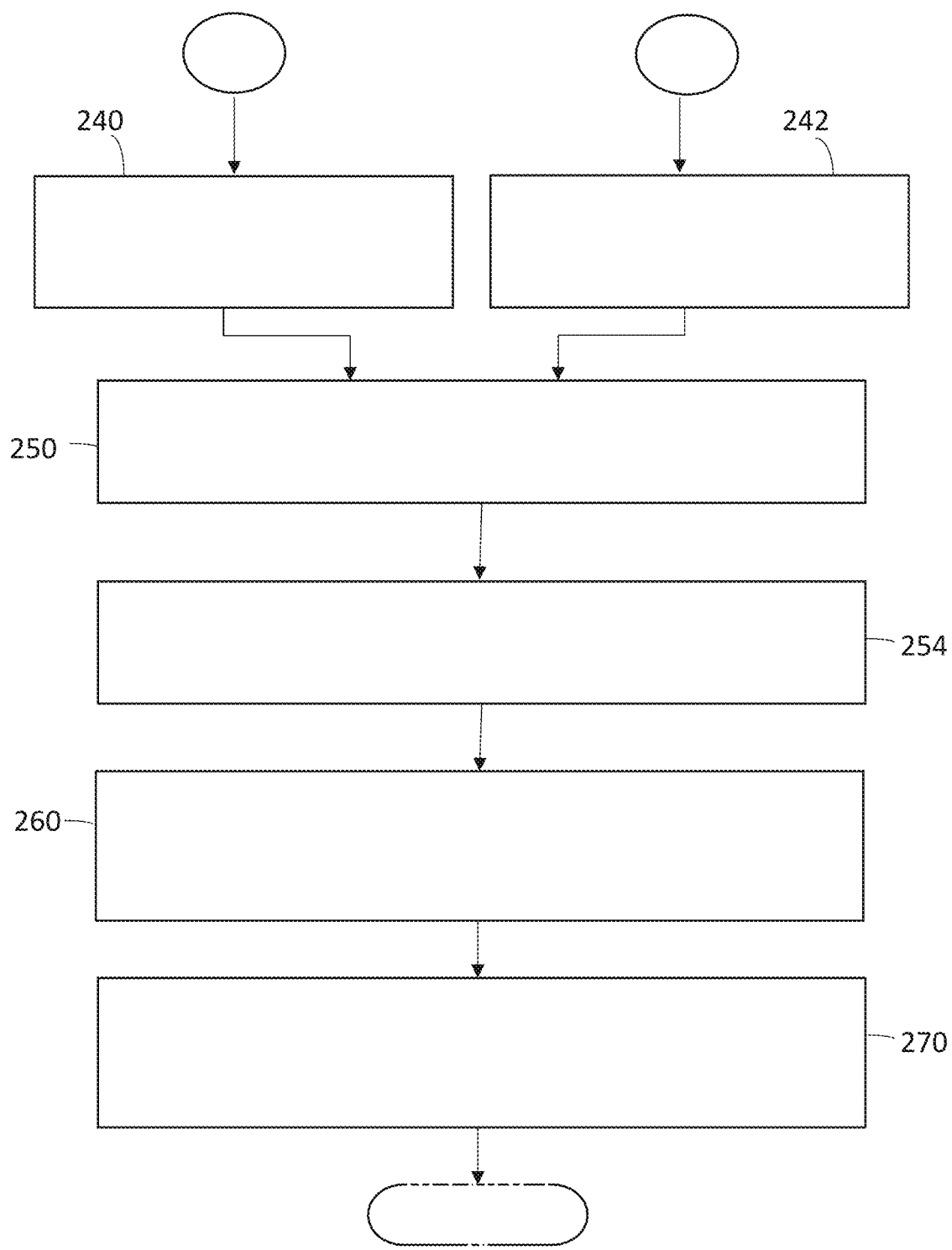

Turning now to the flowchart of FIG. 2, there is shown an example of the present method 200, where the method gathers data at a vehicle 30 (e.g., vehicle video data captured by vehicle camera 40), uses various data extraction techniques and parameters to reduce the amount of data, and provides the processed data to a fog and/or cloud layer 22, 24 where the scenario or conditions encountered by the vehicle can be reconstructed. By reconstructing the encountered scene at the fog and/or cloud layer 22, 24, the method can generate different commands for vehicles 30 or other vehicles 30' in the nearby vicinity that are designed to address the current conditions. If additional data or information is needed by the cloud layer 24 for accurate and thorough scene reconstruction, then the method can adjust the data extraction parameter(s) as needed; if less data is required by the cloud layer 24, then the method may adjust the data extraction parameters so that less data is provided and lower cellular data charges are incurred.

The following description of method 200 is provided in the context of an example where the vehicles 30, 30' are spaced apart (e.g., 1 mile apart), but are driving in the same direction along the same stretch of road where there is an ice patch. The method 200 uses information from the vehicle(s) 30, 30' to reconstruct this scene (i.e., the road segment with the ice patch) back at the cloud layer 24 and to generate appropriate autonomous commands for trailing vehicle 30', as well as other vehicles that may be in the vicinity, so that they are able to successfully negotiate the ice patch. The ice patch scene, however, is just one possible example that has simply been selected for purposes of illustration. The present method and system are in no way limited to this example, as they could be used to reconstruct numerous other scenarios, scenes and/or conditions, including, but not limited to: different types of road surfaces (e.g., paved, gravel, dirt roads, etc.), different road conditions (e.g., dry, wet, icy, flooded roads, etc.), different road construction events (e.g., lane or road closures, lane shifts, detours, etc.), and different road object scenarios (e.g., potholes, debris in the road, disabled vehicles located on the side of the road, etc.), to name just a few. The present method and system may be used to reconstruct any scenario, scene, environment and/or condition where such reconstruction may be useful for generating alerts, warnings, commands and/or otherwise controlling or managing one or more vehicles, such as autonomous or semi-autonomous vehicles 30, 30'.

Beginning with step 210, the method gathers and provides vehicle video data. For instance, step 210 may use one or more vehicle camera(s) 40 mounted on the vehicle to gather raw or heavy vehicle video data, and provide such data to vehicle data processing module 46. The vehicle video data may include a raw video sequence containing numerous individual images or frames, or it may be provided according to some other video format. Once the vehicle video data is gathered and provided to module 46, the method may proceed to step 214.

Figure 3:
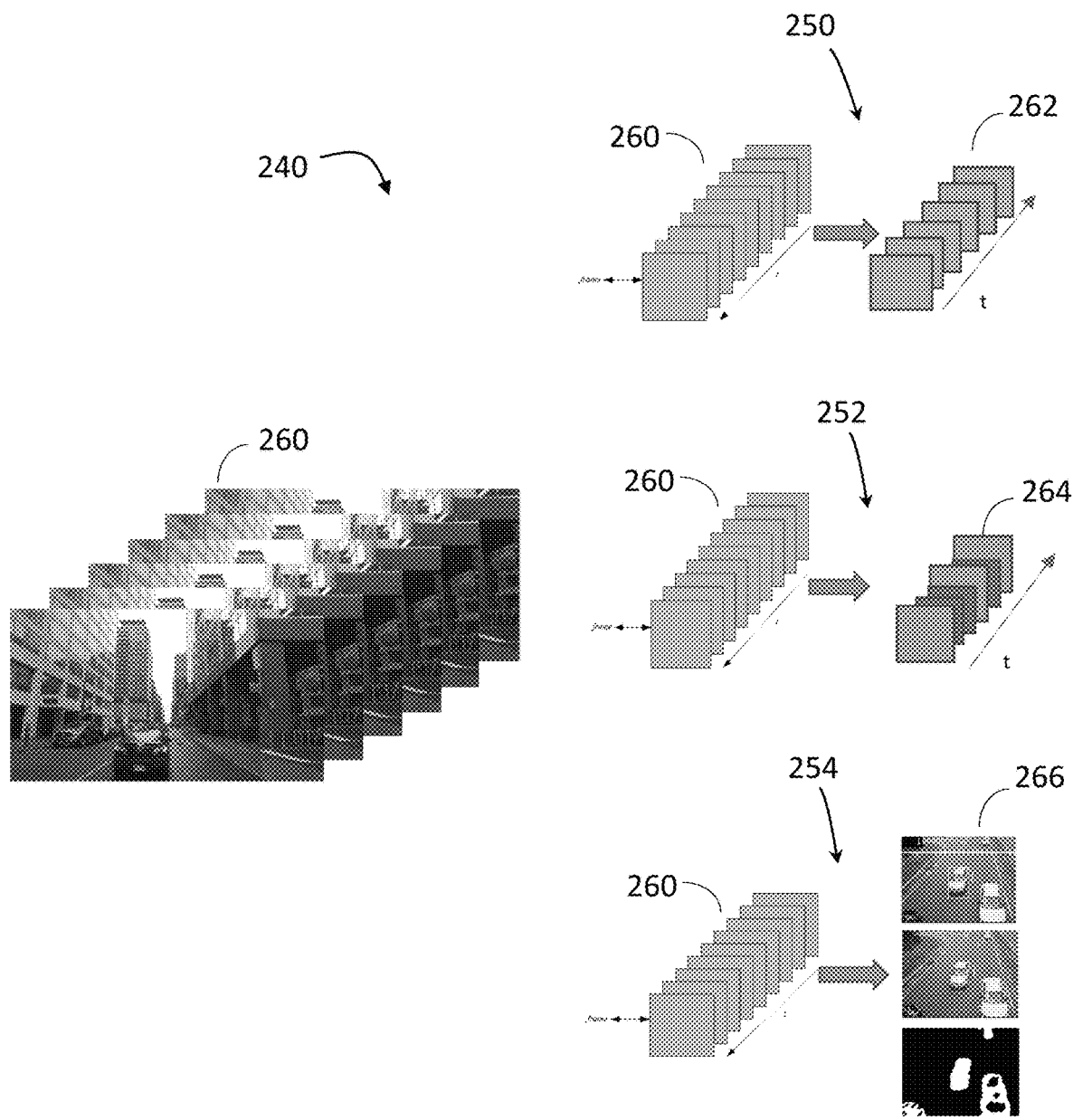
FIG. 3 is a schematic block diagram of a first embodiment of a data extraction step that can be used with the method in FIG. 2, where the first embodiment employs a combination of different down sampling techniques.
Figure 4:
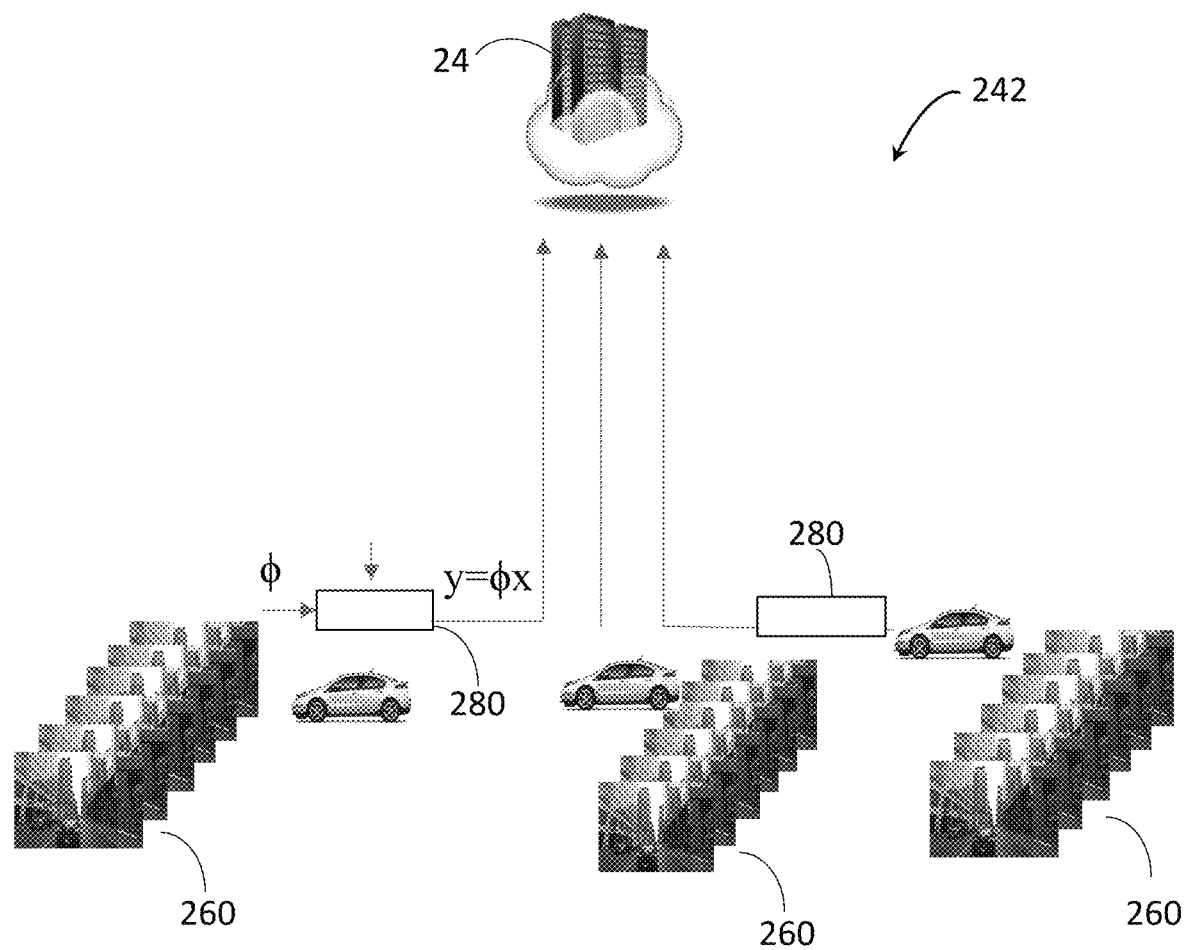
FIG. 4 is a schematic block diagram of a second embodiment of a data extraction step that can be used with the method in FIG. 2, where the second embodiment employs a compressive sampling technique.

In step 214, the method reduces the amount of vehicle video data using different data extraction techniques. Skilled artisans will appreciate that if the method were to send the entire raw video sequence provided by camera 40 over the wireless carrier system 26, particularly if this was multiplied across an entire fleet of vehicles, the resulting cellular data charges would be substantial. Thus, step 214 preemptively reduces the amount of data being sent over the wireless carrier system 26 by employing one or more data extraction technique(s) that can be performed at the vehicle layer 20 and/or the fog layer 22 before sending such data to the cloud layer 24. FIG. 3 shows a first example of a data extraction technique 240 and FIG. 4 shows a second example of a data extraction technique 242. These examples, which may be used separately or together, reduce the vehicle video data by extracting certain information that is deemed important and may rely upon any number of data extraction techniques and/or parameters to do so.

Turning now to FIG. 3, there is shown a first example of a data extraction technique 240 that uses a combination of different down sampling techniques 250-254 to reduce the amount or size of the raw video sequence 260 and, thereby, reduce the amount of data being sent to the cloud layer 24 over the wireless carrier system or cellular network 26. Starting with the time-domain down sampling technique 250, the method uses a data extraction parameter in the form of a time-based sampling rate to sample individual video frames 262 from the raw video sequence. In the event that the raw video sequence 260 is already a discrete-time signal (i.e., it is already digital, as illustrated in FIG. 3), technique 250 reduces the amount of information associated with the raw video sequence 260 by decreasing the time-based sampling rate so that fewer individual video frames or images 262 are sampled, per unit of time. If, hypothetically, the raw video sequence is provided as a continuous-time signal (i.e., it is analog), then the method may first digitize the signal before applying a time-based sampling rate that can be set and/or adjusted by the method. In either event, technique 250 employs a time-based sampling rate that is less than a corresponding sampling rate employed by the vehicle camera(s) 40 so that the amount of information associated with the video is reduced. Skilled artisans will appreciate that a variety of suitable time-domain down sampling techniques could be used with 250 and that the method is not limited to any particular one.

In terms of the pixel-domain down sampling technique 252, the method reduces the amount of information or data in each of the individual video frames 264 by adjusting some combination of the following data extraction parameters: image resolution, image color depth, image field-of-view (FOV) and/or image compression or type (e.g., JPEG, H.26x family, etc.). The specific combination of data extraction parameters used by technique 252 should result in less data per individual image 264 (i.e., a smaller image size) than that of the corresponding images of the raw video sequence 260 gathered by the vehicle camera(s) 40. In one example, pixel-domain down sampling technique 252 reduces the image size of one or more of the individual video frames 264 by reducing the resolution and/or color depth of the image, as well as by cropping out portions of the image that are deemed unnecessary (i.e., reducing the FOV). Skilled artisans will appreciate that there are numerous ways of increasing, decreasing and/or otherwise adjusting the aforementioned image parameters and that any such ways may be employed by technique 252.

Feature-domain down sampling technique 254 reduces the amount of information or data associated with each of the individual video frames or images 266 by identifying particular aspects of each image that are deemed important and discarding other image information. For instance, technique 254 may utilize suitable optical flow or deep learning methods to generate a time series for an object list (e.g., a time series with various data points that track one or more objects in the image). According to another example, technique 254 may use suitable local feature detectors, like SIFT, FAST, ORB, etc., to produce a time series for a feature point (e.g., a time series with various data points that track corners, edges, or other identifiable features of an object in the image). In yet another example, technique 254 may employ some type of deep learning mechanism to create a time series for image segmentation (e.g., a time series with various data points that correspond to a masked image where unnecessary background information has been removed). Those of ordinary skill in the art will appreciate that there are numerous ways and methods for carrying out the aforementioned feature-domain down sampling technique 254 and that any such way may be employed.

Down sampling techniques 250-254 may be used separately or together, they may be used sequentially or concurrently, or they may be used according to some other arrangement. According to one example, time-domain down sampling technique 250 reduces the amount of data being transferred over the wireless carrier system 26 by reducing the number of individual video frames 262, pixel-domain down sampling technique 252 reduces the amount of data being transferred by reducing the amount of information per individual video frame 264, whereas feature-domain down sampling technique 254 reduces the amount of data by reducing the amount of information by just tracking certain objects or features within individual video frames 266. The aforementioned down sampling techniques are examples of different data extraction techniques, each of which may be executed wholly or in part by the vehicle data processing module 46 and is governed by one or more data extraction parameter(s). For technique 250, the time-based sampling rate is a non-limiting example of a data extraction parameter; for technique 252, the image resolution, image color depth, image field-of-view (FOV), image compression and image type are non-limiting examples of data extraction parameters; and for technique 254, the number of objects or features, the number of object or feature data points, the sampling rate for objects or features, and the techniques used to generate the time series are non-limiting examples of data extraction parameters. In a sense, system 10 is a closed-loop, cloud-based system that gathers data at a vehicle layer 20, reconstructs scenes or conditions being encountered by the vehicle layer back at a cloud layer 24, and determines if the reconstructed scenes are sufficiently accurate or detailed to carry out certain vehicle functions, such as controlling one or more autonomous or semi-autonomous vehicles. If the reconstructed scenes are not sufficiently accurate, then the method may make adjustments to one or more data extraction parameter(s) (closed-loop control) so that additional data can be more aggressively gathered at the vehicle layer 20, even if doing so increases cellular data charges. If the reconstructed scenes are sufficiently accurate, then the method may make adjustments to one or more data extraction parameter(s) (closed-loop control) so that less data is sent from the vehicle layer 20, which reduces cellular data charges. In this way, the method balances the need for adequate amounts of data for accurate scenario or scene reconstruction at the cloud layer 24 against the costs associated with providing such data to the cloud layer.

Turning now to FIG. 4, there is shown a second example of a data extraction technique 242 that uses a video compressive sampling mechanism to reduce the amount of data associated with the raw video sequence 260 and, thereby, reduce the amount of data being sent to the cloud layer 24 over the wireless carrier system 26. Data extraction technique 242 is a type of signal processing technique that is designed to reconstruct the raw video sequence 260 at the cloud layer 24, yet do so in an efficient and accurate manner. Skilled artisans will appreciate that there are two conditions that need to be satisfied in order for the video compressive sampling technique to be applicable: sparsity and incoherence. Sparsity, as opposed to density, relates to the number of elements in a set of data that are zero. In the present example, the raw video sequence 260 must include a "sparse" signal $\phi$ where most of the elements or data is zero; with that, the compressive sampling could effectively reduce the size of the video data while preserving the integrity of the video frame sequence. Incoherence is the opposite of coherence, which involves the relationship between signals and relates to the extent that one signal may be predicted from another. In the present example, the sparse signal $\phi$ and the decomposition base $\varphi$ of the signal y must be incoherent. Assuming these conditions are met, the compressive sampled data or output of compressive sampling step 280 is $y=\phi x$ in an abstracted fashion, where signal y is also a sparse signal but is sufficiently large to contain the entropy of signal x, and signal x is a sparse signal. This compressive sampling mechanism could effectively reduce the amount of video frame sequence data, while preserving the information entropy contained in the video sequence. Accordingly, data extraction technique 242 (i.e., video compressive sampling) is preferable for in-network, sparse sampling scenarios.

Once the data extraction or feature extraction has been carried out, the method proceeds to step 216 where the processed video data is sent from the vehicle layer 20 to the fog layer 22 and/or cloud layer 24. The method preferably isolates the processed video data, which is part of a data plane, from index data that is part of a control plane. For example, step 216 may send the processed video data from the vehicle layer 20 to the fog layer 22 via the wireless carrier system 26, and from the fog layer to the cloud layer 24; whereas, index data may be sent directly from the vehicle layer 20 to the cloud layer 24 via the wireless carrier system. It should be appreciated that any suitable combination of data processing, network processing, data reduction and/or other techniques may be carried out at the vehicle layer 20 and/or the fog layer 22 before the processed video data or index data is sent to the cloud layer 24 (it is not required that all of the signal processing occur at the vehicle). In one example, the vehicle camera(s) 40 provide vehicle video data to the vehicle data processing module 46, which processes the vehicle video data and provides processed video data to the vehicle communications module 48, which wirelessly sends the processed video data to the fog layer 22 by way of the wireless carrier system 26, and the fog layer 22 in turn caches some of the processed video data (e.g., at data storage 80-84) and/or sends the processed video data onto the cloud layer 24.

Step 216 preferably keeps the processed video data, as well as other types of information belonging to the data plane, isolated or separated from information belonging to the control plane. This enables the method to separately control cache management involving the data plane and index management involving the control plane, as is understood by those skilled in the art. For example, step 216 may wirelessly send the processed video data (as well as other information designated for the data plane) from the vehicle layer 20 to the fog layer 22 over wireless carrier system 26, at which point the processed video data may be forwarded from the fog layer to the cloud layer 24 and/or cached at the fog layer. Skilled artisans will understand that the data plane, sometimes referred to as the forwarding plane, typically constitutes a higher speed path through a device or series of devices (e.g., routers, switches, etc.), whereas the control plane typically embodies a lower speed or slower path through such devices. For this reason, step 216 may send the processed video data along the data plane in packets that pass through the devices of the fog layer 22 on their way to the cloud layer 24 (as opposed to sending them in packets that are directed to the devices of the fog layer for decision making). It is also possible for some of the processed video data packets to be cached or saved at the fog layer 22 for subsequent retrieval. Skilled artisans will understand that other variants or optimizations could be applied in this case as well.

In step 218, index data is sent from the vehicle layer 20 to the fog layer 22 and/or cloud layer 24 via the wireless carrier system 26. Some non-limiting examples of potential types of index data include: context data (e.g., temporal information, spatial information, driving context information, etc.), content or tag data (e.g., semantic information, object information, etc.), other types of data associated with or corresponding to vehicle video data, as well as various types of search, retrieval, index and/or control commands. In some examples, the index data, which can include various types of meta data, helps explain or provide context to the corresponding vehicle video data being captured. For instance, if vehicle camera 40 captures vehicle video data while the vehicle 30 is traveling at a certain speed, in a certain direction, at a certain GPS location, while engaging certain vehicle dynamic systems (e.g., while traction control is 'on'), the preceding pieces of information may be provided by vehicle sensors 42, 44 and can constitute index data that is associated with the corresponding vehicle video data so as to provide better context for the video. Skilled artisans will understand that the control plane typically constitutes a lower speed path than the data plane because various devices in the control plane oftentimes need to process information, instead of merely forwarding it on. It is possible for step 218 to wirelessly send index data from the vehicle layer 20 to the fog layer 22 for processing thereat, or to wirelessly send index data from the vehicle layer to the cloud layer 24 for processing thereat, or to wirelessly send index data to the fog layer before being sent on to the cloud layer. Although step 218 is schematically shown in FIG. 2 as occurring after step 216, it should be appreciated that these steps may be performed concurrently or in any suitable order and are not limited to the specific sequence shown. In one example, the vehicle sensor(s) 42, 44 and/or vehicle module(s) 50, 52 provide index data to the vehicle data processing module 46, which provides the index data to the vehicle communications module 48, which wirelessly sends the index data to the fog layer 22 and/or the cloud layer 24 by way of wireless carrier system 26. The synchronization between index data and extracted data content could be conducted at the fog layer 22 and/or the cloud layer 24.

Steps 210-218 may be repeated any number of times before a situation arises where the system and method need to reconstruct a scenario or scene at the cloud layer 24. Consider the previous example where vehicles 30, 30' are traveling in the same direction along the same stretch of road where there is an ice patch, but the vehicles 30, 30' are approximately one mile apart. In this scenario, the first vehicle 30 is providing processed video data and index data to the fog and/or cloud layers 22, 24 when it encounters the ice patch, at which point the data provided by vehicle 30 (e.g., index data from sensors 42, 44) informs the system 10 that there is an ice patch in the road. More specifically, the method may determine the approximate location of the ice patch, as well as other characteristics like the size, severity, etc. of the ice patch from such sensor readings. The method may determine that reconstructing the ice patch scenario at the cloud layer 24 would be beneficial for subsequent vehicles, like vehicle 30', so that remedial instructions to help avoid or minimize the impact of the ice patch can be provided (this may be particularly true if vehicle 30' is an autonomous or semi-autonomous vehicle); if so, the method proceeds to step 230.

At step 230, the method uses processed video data and/or index data that was previously provided to reconstruct a certain scene or set of conditions at the cloud layer 24. This can be carried out in any number of different ways, and may be based on processed video data from a single vehicle or on video from multiple vehicles that have each driven through the location in question. According to one embodiment, step 230 reconstructs the scene of a certain location or context by retrieving processed video data and/or index data pertaining to that location from data storage 80-84 in the fog layer 22 and/or data storage 90 in the cloud layer 24. In the event that the reconstruction process utilizes processed video data and/or index data from multiple vehicles that have previously driven by the location in question, step 230 may search and retrieve processed video data stored in data storage 80-84, 90 (e.g., search the video archives for recent video data from different vehicles that correspond to the same location) and then stitch or otherwise combine the relevant video data, in conjunction with corresponding index data, so that an accurate portrayal of the scene is reassembled. It is possible that processed video data from one vehicle may have captured a feature or aspect of the scene that was missed in video footage from another vehicle, thus, combining multiple sources of such video may yield a richer and more complete picture of the scene in question.

In the example of the ice patch, the processed video data and/or index data from vehicle 30, as well as that from previous vehicles not shown in the drawings, may be retrieved from data storage 80-84, 90 so that the ice patch conditions are remotely reconstructed as best as possible at the cloud layer 24. Such conditions may include details like: the GPS coordinates where the ice patch was detected, the location within the lane where the ice patch was detected (e.g., the ice patch is located on the left half of the lane), the lateral or longitudinal size of the ice patch (e.g., if the ice patch longitudinally extends for a substantial distance within the lane), the impact the ice patch had on the traction control systems of the previous vehicles, etc. These and other details may be discerned from the video data itself (e.g., by using the reflectivity of the ice during image analysis), or they may be gathered from the corresponding index data, or perhaps from another source. In any case, the reconstructed scene may help the method and system generate commands so that the trailing vehicle 30' can avoid or minimize the impact of the ice patch, as will be explained. In one possible example, cloud layer 24 users a global video indexer and a search/retrieval interface to interact with data storage in the fog and/or cloud layer to carry out a scene reconstruction process, but other embodiments are possible as well.

Next, the method evaluates the reconstructed vehicle scene to determine if more or less data pertaining to the scene is needed, step 232. According to one example, the method evaluates the reconstructed vehicle scene by generating a confidence level score that is representative of how confident or assured the method is in the accuracy or completeness of the reconstructed vehicle scene. Skilled artisans will appreciate that one of a number of different techniques may be used to calculate or otherwise generate a confidence level score. This includes, for example, using the following iterative algorithm or protocol:

$$X(i)=x(i-1)+\phi^T(y-\phi x(i-1)),$$

where x(i) and x(i−1) represent the data in the original data representation formats, $\phi^T$ represents the projection/conversion factor that translates the original data representation format to the newly formed data representation formats, y−φx(i−1) represents the newly formed data representation formats. Various techniques may be employed for generating a confidence level score, any one of which may be used here.

Next, step 234 compares the confidence level score to a confidence threshold. If the confidence level score is not greater than the confidence threshold (i.e., is equal to or less than), then the method proceeds to step 240, where the method adjusts one or more data extraction parameters so that the fidelity or detail for that scene or location is enhanced. In the example of the ice patch scenario described above, if step 240 determines that there is not enough detail or resolution in the processed video data for the location pertaining to the ice patch (i.e., the confidence level score is less than the confidence threshold), then step 240 may adjust one or more data extraction parameter(s) so that additional information can be gathered by the following vehicle 30'. In one instance, step 240 may increase one or more of the following data extraction parameters: the time-based sampling rate, the image resolution, the image color depth, the image field-of-view (FOV), change the image compression or type (e.g., JPEG, H.26x family, etc.) and/or change the feature-domain down sampling parameters, to cite a few possibilities, so that additional details or information regarding the ice patch can be gleaned by the cloud layer 24 and used to the benefit of the next vehicle 30'. In step 250, the cloud layer 24 sends the adjusted data extraction parameter(s) to the fog layer 22 and/or the vehicle layer 20 so that the changes can be implemented. As acknowledged earlier, adjusting or modifying the data extraction parameters in this way may result in increased cellular data charges for video transmissions associated with this particular location, but the method will have deemed this a worthwhile expense.

If, on the other hand, the confidence level score is greater than the confidence threshold, then the method proceeds to step 242, where the method adjusts one or more data extraction parameters so that the fidelity or detail for that scene or location is reduced. This generally reflects a situation where the system and method do not require all of the video data being gathered and transmitted and, in an effort to reduce unnecessary cellular data charges, the method reduces or decreases the fidelity or detail of the gathered information. Again, step 250 involves the cloud layer 24 sending the adjusted data extraction parameter(s) to the fog layer 22 and/or the vehicle layer 20 so that the corresponding changes can be implemented.

After receiving the adjusted data extraction parameter(s) at the vehicle layer 20, step 254 implements the changes so that one or more of the vehicles gather and/or reduce data according to the modified parameters. Returning to the ice patch example, assuming that the method in steps 234, 240 determined that additional information was needed from the processed video data (i.e., the video did not provide the level of detail or contrast needed for fully analyzing the ice patch), step 254 could send data extraction parameter changes to the trailing vehicle 30' so that when that vehicle encounters the ice patch it will provide video data at a higher level of fidelity, even if doing so incurs additional cellular charges, for improved scene reconstruction the next time around. It should be noted that the instructions in steps 240, 250 that increase or enhance the fidelity of the processed video data may be limited or confined to the area surrounding the ice patch (e.g., the location or context of the ice patch, the direction of travel, etc.), so that the additional cellular charges are only incurred for that small or targeted geographic area and not for all areas.

Step 270, which is an optional step, generates one or more commands for an autonomous or semi-autonomous vehicle based on the outcome of the vehicle scene reconstruction. Once again referring to the ice patch example, if the method determines that vehicle 30 has encountered an ice patch at a certain GPS location, and the ice patch is only on the left side of the lane, then step 270 may generate and send autonomous driving commands to vehicle 30' instructing it to gradually move to the right side of the lane as it approaches the location of the ice patch. This assumes, of course, that there are no obstacles or other issues that would impede vehicle 30' from making this autonomous driving maneuver. Skilled artisans will appreciate that steering, braking and/or acceleration commands are only some of the potential driving commands that could be provided to autonomous or semi-autonomous vehicle 30' in response to the scene reconstruction. Numerous others certainly exist as well.

It is to be understood that the foregoing description is not a definition of the invention, but is a description of one or more exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of reconstructing a vehicle scene with a cloud-based system, the cloud-based system includes a vehicle layer, a fog layer and a cloud layer, the method comprising the steps:
 gathering vehicle video data with one or more vehicle camera(s);
 processing the vehicle video data using one or more data extraction technique(s), the data extraction technique(s) are carried out according to one or more data extraction parameter(s);
 sending the processed video data to the fog layer and/or the cloud layer;
 sending index data to the fog layer and/or the cloud layer;

reconstructing the vehicle scene at the cloud layer using the processed video data and the index data;

evaluating the reconstructed vehicle scene at the cloud layer to determine if more data, less data or different data is needed from the vehicle layer; and making adjustments to the data extraction parameter(s) used by the vehicle layer, wherein the adjustments are based on the determination that more data, less data or different data is needed from the vehicle layer.

2. The method of claim 1, wherein the data extraction technique(s) include at least one technique selected from a list consisting of: a time-domain down sampling technique, a pixel-domain down sampling technique, or a feature-domain down sampling technique.

3. The method of claim 2, wherein the data extraction technique is the time-domain down sampling technique and the data extraction parameter is a time-based sampling rate, and wherein the method reduces the vehicle video data being transferred to the cloud layer over a wireless carrier system by using the time-based sampling rate to reduce the number of individual video frames.

4. The method of claim 2, wherein the data extraction technique is the pixel-domain down sampling technique and the data extraction parameter includes at least one parameter selected from a list consisting of: image resolution, image color depth, image field-of-view (FOV), image compression, or image type, and wherein the method reduces the vehicle video data being transferred to the cloud layer over a wireless carrier system by using the at least one parameter to reduce the amount of information per individual video frame.

5. The method of claim 2, wherein the data extraction technique is the feature-domain down sampling technique and the data extraction parameter includes at least one parameter selected from a list consisting of: a number of objects or features, a number of object or feature data points, a sampling rate for objects or features, or a technique used to convert or project original data into an orthogonal time series, and wherein the method reduces the vehicle video data being transferred to the cloud layer over a wireless carrier system by using the at least one parameter to only track certain objects or features within individual video frames.

6. The method of claim 1, wherein the sending the processed video data step further comprises sending the processed video data from the vehicle layer to the fog layer via a wireless carrier system, and sending the processed video data from the fog layer to the cloud layer.

7. The method of claim 6, wherein the sending the processed video data step further comprises caching at least some of the processed video data at the fog layer.

8. The method of claim 1, wherein the sending the index data step further comprises sending the index data from the vehicle layer to the fog layer and/or the cloud layer via a wireless carrier system.

9. The method of claim 1, further comprising the step of:
isolating the processed video data from the index data so that a data plane is maintained separate from a control plane.

10. The method of claim 1, wherein the sending the index data step further comprises sending at least one piece of index data selected from a list consisting of: context data, content or tag data, search data, retrieval data, index commands or control commands.

11. The method of claim 1, wherein the reconstructing step further comprises searching and retrieving processed video data from the fog layer and index data from the cloud layer that was previously saved in order to reconstruct the vehicle scene at the cloud layer, wherein the previously saved data are retrieved based on a location of the vehicle scene being reconstructed.

12. The method of claim 11, wherein the previously saved data were provided by a plurality of vehicles who previously drove by the location of the vehicle scene being reconstructed.

13. The method of claim 1, wherein the evaluating step further comprises evaluating the reconstructed vehicle scene by generating a confidence level score representative of the confidence of the system in the accuracy or completeness of the reconstructed vehicle scene.

14. The method of claim 13, wherein the evaluating step further comprises comparing the confidence level score to a confidence threshold, when the confidence level score is greater than the confidence threshold then adjusting the data extraction parameters so that less processed video data and/or index data is provided by the vehicle layer, and when the confidence level score is not greater than the confidence threshold then adjusting the data extraction parameters so that more processed video data and/or index data is provided by the vehicle layer.

15. The method of claim 14, wherein the making adjustments step further comprises adjusting at least one data extraction parameter selected from a list consisting of: a time-based sampling rate, an image resolution, an image color depth, or an image field-of-view (FOV) so that more or less data is needed from the vehicle layer.

16. The method of claim 1, wherein the gathering step further comprises gathering vehicle video data with one or more vehicle camera(s) located on a first vehicle of the vehicle layer, whereas the making adjustments step further comprises making adjustments to data extraction parameter(s) used by a second vehicle of the vehicle layer, wherein the second vehicle encounters the vehicle scene after the first vehicle.

17. The method of claim 1, further comprising the step of:
generating one or more commands for an autonomous or semi-autonomous vehicle based on the outcome of the vehicle scene reconstruction.

18. A cloud-based system for reconstructing a vehicle scene, comprising:
a vehicle layer having a plurality of autonomous or semi-autonomous vehicles, each of the vehicles includes one or more vehicle camera(s);
a fog layer having hardware and being connected to the vehicle layer via a wireless carrier system; and
a cloud layer having hardware and being connected to the vehicle layer via the wireless carrier system and being connected to the fog layer;
the vehicle layer hardware is configured to: gather vehicle video data with the vehicle camera(s), process the vehicle video data using one or more data extraction technique(s) that are carried out according to one or more data extraction parameter(s), send the processed video data to the fog layer and/or the cloud layer, and send index data to the fog layer and/or the cloud layer;
the cloud layer hardware is configured to: reconstruct the vehicle scene using the processed video data and the index data, evaluate the reconstructed vehicle scene to determine if more data, less data or different data is needed from the vehicle layer, and make adjustments to the data extraction parameter(s) used by the vehicle layer;

wherein the adjustments are based on the determination that more data, less data or different data is needed from the vehicle layer.

* * * * *